US009593033B2

(12) United States Patent
Aburada et al.

(10) Patent No.: US 9,593,033 B2
(45) Date of Patent: Mar. 14, 2017

(54) GLASS MANUFACTURING APPARATUS AND METHOD FOR MANUFACTURING GLASS SHEET

(71) Applicant: Corning Incorporated, Corning, NY (US)

(72) Inventors: Tomohiro Aburada, Kakegawa (JP); Steven Roy Burdette, Big Flats, NY (US); Masumi Kihata, Kakegawa (JP); Chris Scott Kogge, Danville, KY (US); Gautam Narendra Kudva, Horseheads, NY (US); Michael Yoshiya Nishimoto, Horseheads, NY (US); Gary Graham Squier, Elmira, NY (US); David John Ulrich, Burdett, NY (US)

(73) Assignee: Corning Incorporated, Corning, NY (US)

( * ) Notice: Subject to any disclaimer, the term of this patent is extended or adjusted under 35 U.S.C. 154(b) by 71 days.

(21) Appl. No.: 14/046,419

(22) Filed: Oct. 4, 2013

(65) Prior Publication Data
US 2015/0096330 A1    Apr. 9, 2015

(51) Int. Cl.
*C03B 17/06*    (2006.01)
(52) U.S. Cl.
CPC .................. *C03B 17/068* (2013.01)
(58) Field of Classification Search
CPC .... C03B 17/061; C03B 17/064; C03B 17/068
See application file for complete search history.

(56) References Cited

U.S. PATENT DOCUMENTS

| 1,586,618 | A | 6/1926 | Ferngren |
| 3,338,696 | A | 8/1967 | Dockerty ........................ 65/145 |
| 3,353,943 | A | 11/1967 | Loutte |
| 3,419,374 | A | 12/1968 | Offenbacher et al. .......... 65/160 |
| 3,440,030 | A | 4/1969 | Thompson et al. |
| 3,520,672 | A | 7/1970 | Greenler et al. |
| 3,682,609 | A | 8/1972 | Dockerty ......................... 65/83 |

(Continued)

FOREIGN PATENT DOCUMENTS

| JP | 05124826 | 5/1993 |
| JP | 05124827 | 5/1993 |

(Continued)

OTHER PUBLICATIONS

KR2012049950—machine translation.
(Continued)

*Primary Examiner* — Jodi C Franklin
(74) *Attorney, Agent, or Firm* — Matthew J. Mason

(57) ABSTRACT

A glass manufacturing apparatus comprises a forming device configured to produce a glass ribbon and a control device configured to independently operate a first pull roll apparatus, a second pull roll apparatus, and a third pull roll apparatus such that at least one of a first upstream pair of draw rolls rotates with a substantially constant torque, at least one of a first midstream pair of draw rolls rotates with a substantially constant torque, and at least one of a first downstream pair of draw rolls rotates with a substantially constant angular velocity. In further examples, methods of manufacturing a glass ribbon are provided.

15 Claims, 9 Drawing Sheets

(56) References Cited

U.S. PATENT DOCUMENTS

| | | | |
|---|---|---|---|
| 3,695,859 A | 10/1972 | Dickerson et al. | |
| 3,771,985 A | 11/1973 | Dickinson | 65/99 A |
| 3,773,486 A | 11/1973 | Toussaint et al. | 65/29 |
| 3,926,605 A | 12/1975 | Kunkle | 65/99 |
| 4,354,866 A | 10/1982 | Mouly | 65/99.5 |
| 4,375,370 A | 3/1983 | Mouly | 65/99.5 |
| 4,612,030 A | 9/1986 | Smids | 65/91 |
| 6,616,025 B1 | 9/2003 | Andrewlavage, Jr. | 225/96.5 |
| 6,758,064 B1 | 7/2004 | Kariya | 65/91 |
| 7,122,242 B2 | 10/2006 | DiGiampaolo et al. | 428/156 |
| 7,430,880 B2 | 10/2008 | Butts et al. | 65/253 |
| 7,984,625 B2 | 7/2011 | Markham et al. | 65/29.12 |
| 8,037,716 B2 | 10/2011 | Aniolek et al. | 65/95 |
| 8,047,085 B2 | 11/2011 | Cady et al. | 73/862.49 |
| 8,146,388 B2 | 4/2012 | Anderson et al. | 65/205 |
| 8,443,629 B2 | 5/2013 | Kuroiwa et al. | |
| 2005/0268655 A1 | 12/2005 | Butts et al. | 65/29.12 |
| 2006/0042314 A1 | 3/2006 | Abbott, III et al. | 65/25.3 |
| 2009/0107182 A1* | 4/2009 | Anderson | C03B 13/16 65/90 |
| 2011/0100056 A1* | 5/2011 | Anderson | C03B 17/067 65/90 |
| 2011/0209502 A1* | 9/2011 | El Kahlout | C03B 17/064 65/90 |
| 2011/0314870 A1* | 12/2011 | Fredholm | C03B 17/062 65/94 |
| 2013/0008208 A1* | 1/2013 | Kariya | C03B 17/067 65/53 |
| 2013/0133371 A1* | 5/2013 | Burdette | C03B 17/068 65/91 |
| 2013/0219964 A1* | 8/2013 | Kudva | C03B 17/068 65/29.1 |
| 2013/0319050 A1* | 12/2013 | Agrawal | C03B 17/068 65/91 |

FOREIGN PATENT DOCUMENTS

| | | |
|---|---|---|
| JP | 10-291826 | 11/1998 |
| JP | 2007051028 | 3/2007 |
| KR | 2012049950 | 5/2012 |
| WO | 2006/121709 | 11/2006 |

OTHER PUBLICATIONS

PCTUS2014058200 International Search Report.
PCTUS2014058200 Written Opinion of the International Searching Authority.

* cited by examiner

GLASS MANUFACTURING APPARATUS AND METHOD FOR MANUFACTURING GLASS SHEET

BACKGROUND

Field

Exemplary embodiments of the present disclosure relate to an apparatus and method to manufacture glass sheet, and to fusion down draw apparatus and method to manufacture glass sheet.

Discussion of the Background

Recently, interest in fusion down draw as a method of manufacturing glass sheets has been receiving increasing interest. The fusion down draw glass manufacturing may include a lower pull roll apparatus having a master motor to rotate a lower pair of rolls at a constant angular velocity and an upper pull roll apparatus with upper slave motors configured to rotate an upper pair of rolls at torques that match a predetermined percentage of the measured torque of the master motor of the lower pair of rolls.

As described in co-pending U.S. patent application Ser. No. 13/305,810, filed Nov. 29, 2011, the entire contents of which hereby are incorporated by reference as if fully set forth herein, the master/slave configuration of the lower/upper pull roll apparatus can be beneficial under various process applications.

Further, the fusion down draw glass manufacturing process may include a control device configured to independently operate the upper pull roll apparatus and the lower pull roll apparatus such that the upper pair of draw rolls rotates with a substantially constant torque and the lower pair of draw rolls rotates with a substantially constant angular velocity.

As glass sheet requirements become more demanding, capabilities of these pull roll apparatuses may be exceeded.

The above information disclosed in this Background section is only for enhancement of understanding of the background of the disclosure and therefore it may contain information that does not form any part of the prior art nor what the prior art may suggest to a person of ordinary skill in the art.

SUMMARY

Exemplary embodiments of the present disclosure provide a glass manufacturing apparatus to form a glass ribbon.

Exemplary embodiments of the present disclosure also provide a method to manufacture a glass ribbon.

Additional features will be set forth in the description which follows, and in part will be apparent from the description, or may be learned by practice of the disclosed exemplary embodiments.

An exemplary embodiment discloses an apparatus configured to produce a glass ribbon. The apparatus includes a forming device that produces a glass ribbon including a width extending between a first edge portion and a second edge portion, a first pull roll apparatus, a second pull roll apparatus, a third pull roll apparatus, and a control device configured to independently operate the first pull roll apparatus, the second pull roll apparatus, and the third pull roll apparatus. The first pull roll apparatus includes a first upstream pair of draw rolls to draw the first edge portion of the glass ribbon from the forming device along a draw path extending transverse to the width of the glass ribbon. The second pull roll apparatus includes a first midstream pair of draw rolls positioned downstream along the draw path from the first upstream pair of draw rolls, such that the first midstream pair of draw rolls further draws the first edge portion of the glass ribbon along the draw path. The third pull roll apparatus includes a first downstream pair of draw rolls positioned downstream along the draw path from the first midstream pair of draw rolls to further draw the first edge portion of the glass ribbon along the draw path. The control device independently operates the first pull roll apparatus, the second pull roll apparatus, and the third pull roll apparatus such that at least one draw roll of the first upstream pair of draw rolls rotates with a substantially constant torque, at least one draw roll of the first midstream pair of draw rolls rotates with a substantially constant torque and at least one draw roll of the first downstream pair of draw rolls rotates with a substantially constant angular velocity.

An exemplary embodiment also discloses a method of manufacturing a glass ribbon. The method includes providing a first pull roll apparatus comprising a first upstream pair of draw rolls, a second pull roll apparatus comprising a first midstream pair of draw rolls positioned downstream along a draw path from the first upstream pair of draw rolls, and a third pull roll apparatus comprising a first downstream pair of draw rolls positioned downstream along the draw path from the first midstream pair of draw rolls. The method includes forming a glass ribbon with a width extending between a first edge portion and a second edge portion, and independently operating the first pull roll apparatus such that at least one draw roll of the first upstream pair of draw rolls rotates with a substantially constant torque to draw the first edge portion of the glass ribbon along the draw path. The method includes independently operating the second pull roll apparatus such that at least one draw roll of the first midstream pair of draw rolls rotates with a substantially constant torque to further draw the first edge portion of the glass ribbon along the draw path and independently operating the third pull roll apparatus such that at least one of the first downstream pair of draw rolls rotates with a substantially constant angular velocity to further draw the first edge portion of the glass ribbon along the draw path.

It is to be understood that both the foregoing general description and the following detailed description are exemplary and explanatory and are intended to provide further explanation of the disclosure.

BRIEF DESCRIPTION OF THE DRAWINGS

The accompanying drawings, which are included to provide a further understanding of the exemplary embodiments and are incorporated in and constitute a part of this specification, illustrate exemplary embodiments of the disclosure, and together with the description serve to explain the principles of the disclosure.

DETAILED DESCRIPTION OF THE ILLUSTRATED EMBODIMENTS

Figure 1:
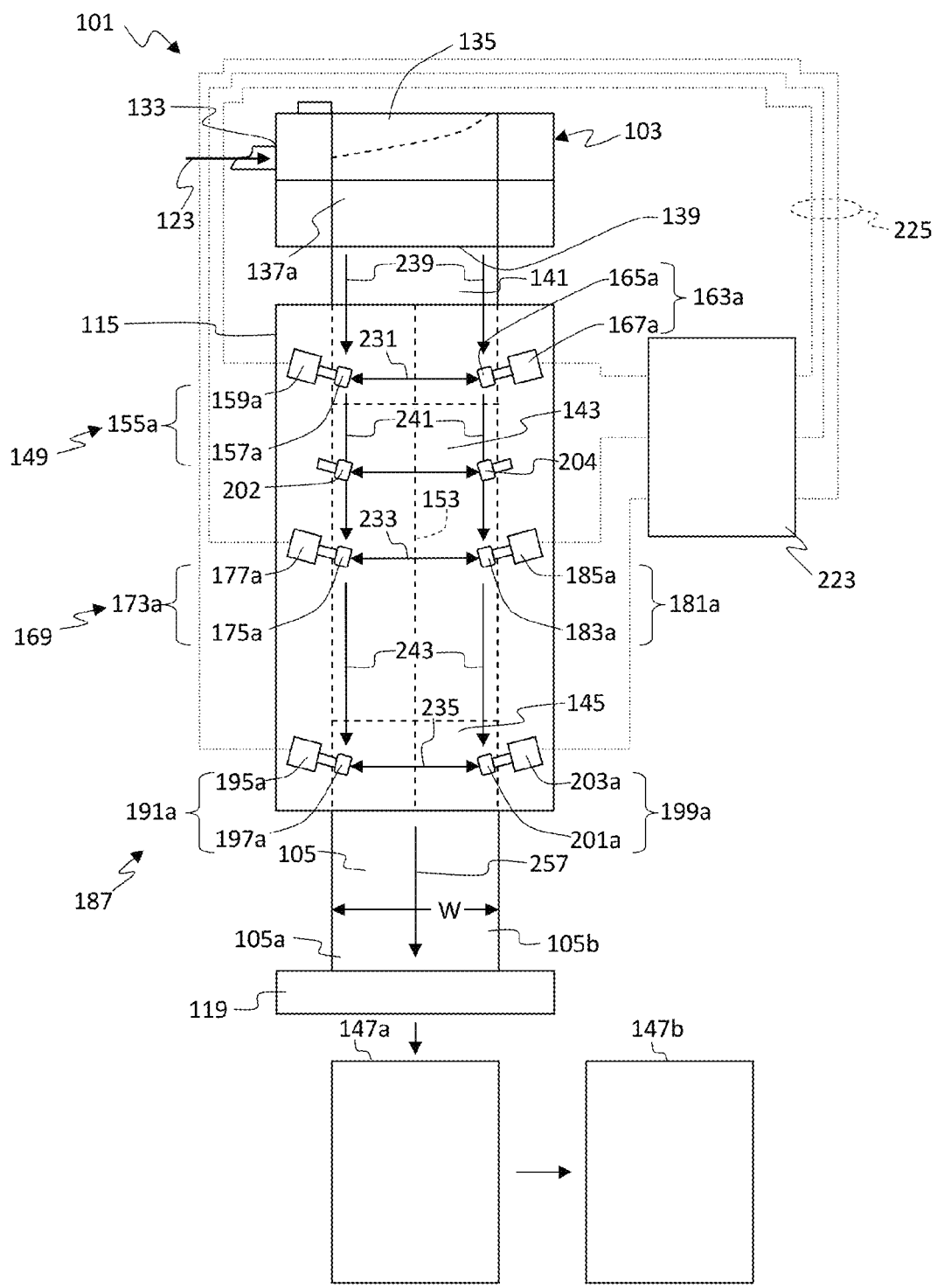
FIG. 1 illustrates a glass manufacturing apparatus according to an exemplary embodiment of the disclosure.

The disclosure is described more fully hereinafter with reference to the accompanying drawings, in which exemplary embodiments are shown. The claims may, however, be embodied in many different forms and should not be construed as limited to the embodiments set forth herein. Rather, these embodiments are provided so that this disclosure is thorough, and will fully convey the scope of the claims to those skilled in the art. In the drawings, the size and relative sizes of layers and regions may be exaggerated for clarity. Like reference numerals in the drawings denote like elements.

It will be understood that when an element is referred to as being "on" or "connected to" another element, it can be directly on or directly connected to the other element, or intervening elements may be present. In contrast, when an element is referred to as being "directly on" or "directly connected to" another element, there are no intervening elements present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

Figure 2:
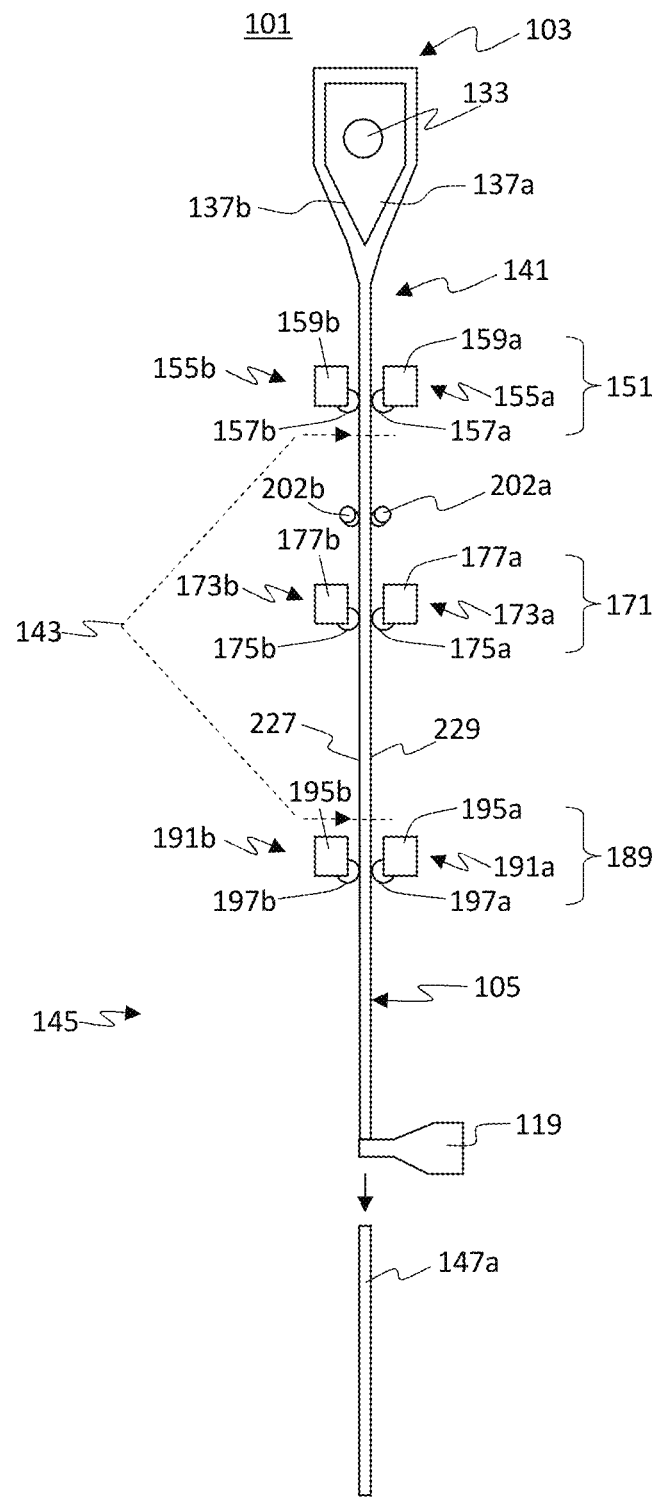
FIG. 2 is a side view of the glass manufacturing apparatus of FIG. 1 according to an exemplary embodiment of the disclosure.

Referring now to FIGS. 1 and 2, there is shown schematic front and side views of an exemplary embodiment of a glass manufacturing apparatus 101 that may be used in accordance with aspects of the disclosure. The glass manufacturing apparatus 101 is illustrated as a down draw fusion apparatus although other forming apparatus may be used in further examples. In one example, the glass manufacturing apparatus 101 can include a forming device 103 to produce a glass ribbon 105 including a width "W" extending between a first edge portion 105a and a second edge portion 105b of the glass ribbon 105.

As further illustrated in FIGS. 1 and 2, the glass manufacturing apparatus 101 can include a pull roll device 115 and a separating device 119. Various forming devices may be used in accordance with aspects of the disclosure. For example, as shown in FIGS. 1 and 2, the forming device 103 includes an opening 133 that receives molten glass 123 which flows into a trough 135. The molten glass 123 from the trough 135 then overflows and runs down two sides 137a and 137b before fusing together at a root 139 of the forming device 103. The root 139 is where the two sides 137a, 137b come together and where the two overflow walls of molten glass 123 flowing over each of the two sides 137a, 137b fuse together as the glass ribbon 105 drawn downward off the root 139.

A portion of the glass ribbon 105 is drawn off the root 139 into a viscous zone 141 wherein the glass ribbon 105 begins thinning to a final thickness. The portion of the glass ribbon 105 is then drawn from the viscous zone 141 into a setting zone 143 (visco-elastic zone). In the setting zone 143, the portion of the glass ribbon 105 is set from a viscous state to an elastic state with the desired profile. The portion of the glass ribbon 105 is then drawn from the setting zone 143 to an elastic zone 145. Once in the elastic zone 145, the glass ribbon 105 may be deformed, within limits, without permanently changing the profile of the glass ribbon 105.

After the portion of the glass ribbon 105 enters the elastic zone 145, a separating device 119 may be provided to sequentially separate a plurality of glass sheets 147a, 147b from the glass ribbon 105 over a period of time. The separating device 119 may comprise the illustrated traveling anvil machine although further separating devices may be provided in further examples.

The glass manufacturing apparatus 101 further includes a pull roll device 115 schematically illustrated in FIGS. 1 and 2. As discussed more fully below, the pull roll device 215 may be provided to help draw the glass ribbon 105 from the root 139 and may isolate transmission of forces up the glass ribbon 105 from the elastic zone 145 to the setting zone 143. As such, the pull roll devices of the present disclosure can draw the glass ribbon to the desired thickness while also reducing residual stress within the glass sheet. As shown, the pull roll device 115 can be located within the viscous zone 141, the setting zone 143, and the elastic zone 145. Indeed, as illustrated in the drawings, the first pull roll apparatus (discussed more fully below) is located within the viscous zone 141 or may be located at the top of the setting zone 143 adjacent to the viscous zone 141. The second pull roll apparatus (discussed more fully below) is located within the setting zone 143 and the third pull roll apparatus (discussed more fully below) is located within the elastic zone 145.

Figure 3:
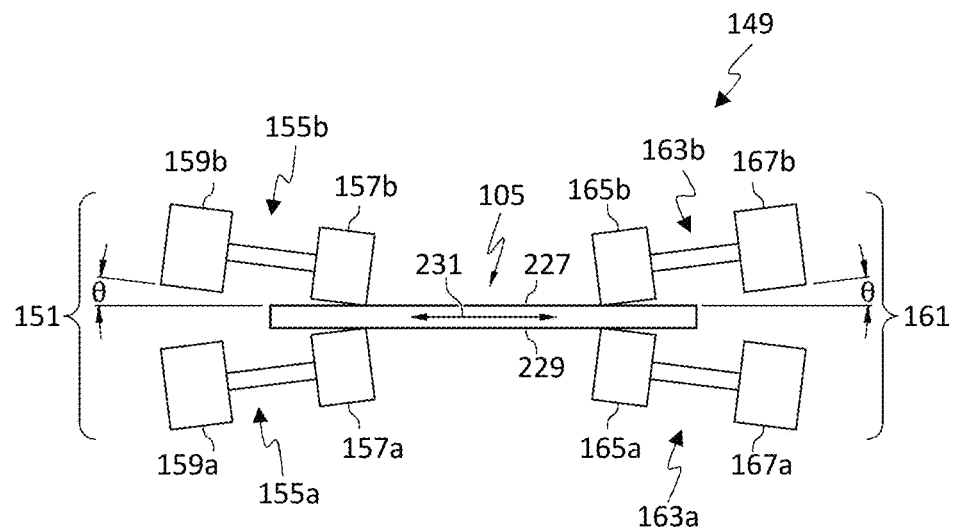
FIG. 3 is a top view of the glass manufacturing apparatus of FIG. 1 at a first elevation according to an exemplary embodiment of the disclosure.

FIG. 1, FIG. 2, and FIG. 3 illustrate a first example of the pull roll device 115 in accordance with one exemplary embodiment of the disclosure although other pull roll device 115 constructions may be provided in further examples. The pull roll device 115 can include a first pull roll apparatus 149 including a first upstream pair of draw rolls 151 configured to draw the first edge portion 105a of the glass ribbon 105 from the forming device 103 along a draw path 153 extending transverse to the width "W" of the glass ribbon 105.

As shown, the first upstream pair of draw rolls 151 can include a first pull roll member 155a and a second pull roll member 155b. The first and second pull roll members 155a, 155b can each be provided with a respective refractory roll covering 157a, 157b configured to engage the first edge portion 105a of the glass ribbon 105 therebetween. At least one of the first and second pull roll members 155a, 155b may be provided with a respective motor 159a, 159b. For example, as shown, both the first and second pull roll members 155a, 155b are provided with a respective motor 159a, 159b. In further examples, only one of the first and second pull roll members 155a, 155b is provided with a motor wherein the other pull roll member may be provided with a bearing such that only one of the first and second pull roll members 155a, 155b is driven.

In another example, in addition or in alternative to the first upstream pair of draw rolls 151, the first pull roll apparatus 149 can include a second upstream pair of draw rolls 161 configured to draw the second edge portion 105b of the glass ribbon 105 from the forming device 103 along the draw path 153. As shown, the second upstream pair of draw rolls 161 can include a first pull roll member 163a and a second pull roll member 163b. The first and second pull roll members 163a, 163b can each be provided with a respective refractory roll covering 165a, 165b configured to engage the second edge portion 105b of the glass ribbon 105 therebetween. At least one of the first and second pull roll members 163a, 163b may be provided with a respective motor 167a, 167b. For example, as shown, both the first and second pull roll members 163a, 163b are provided with a respective motor 167a, 167b. In further examples, only one of the first and second pull roll members 167a, 167b is provided with a motor wherein the other pull roll member may be provided with a bearing such that only one of the first and second pull roll members 167a, 167b is driven.

Figure 4:
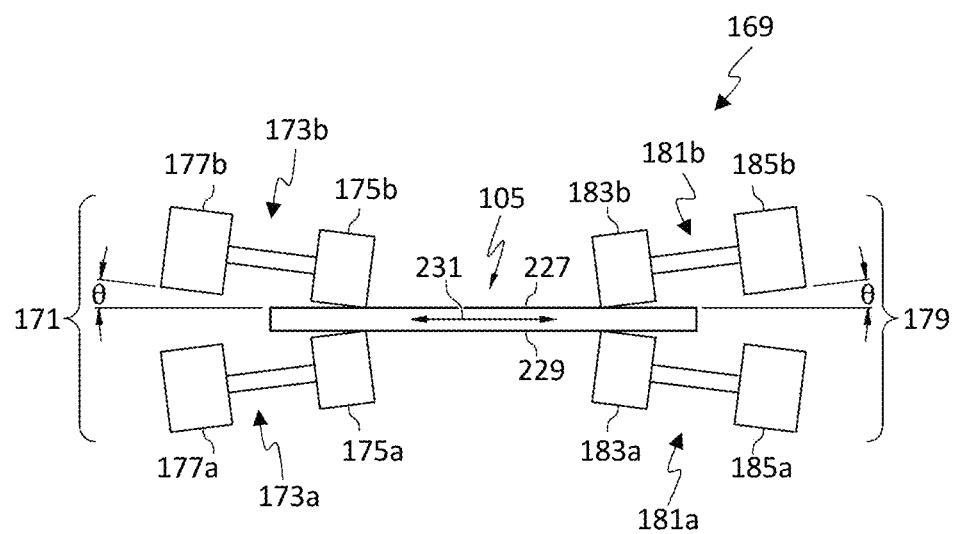
FIG. 4 is a top view of the glass manufacturing apparatus of FIG. 1 at a second elevation according to an exemplary embodiment of the disclosure.

As shown in FIG. 1, FIG. 2, and FIG. 4, the pull roll device 115 further includes a second pull roll apparatus 169 including a first midstream pair of draw rolls 171 positioned downstream along the draw path 153 from the first upstream pair of draw rolls 151, wherein the first midstream pair of draw rolls 171 are configured to further draw the first edge portion 105a of the glass ribbon 105 along the draw path 153. As shown, the first midstream pair of draw rolls 171 can include a first pull roll member 173a and a second pull roll member 173b. The first and second pull roll members 173a, 173b can each be provided with a respective refractory roll covering 175a, 175b configured to engage the first edge portion 105a of the glass ribbon 205 therebetween. At least one of the first and second pull roll members 173a, 173b may be provided with a respective motor 177a, 177b. For example, as shown, both the first and second pull roll members 173a, 173b are provided with a respective motor 177a, 177b. In further examples, only one of the first and second pull roll members 173a, 173b is provided with a motor wherein the other pull roll member may be provided with a bearing such that only one of the first and second pull roll members 173a, 173b is driven.

In another example, in addition or in alternative to the first midstream pair of draw rolls 171, the second pull roll apparatus 169 can include a second midstream pair of draw rolls 179 positioned downstream along the draw path 153 from the second upstream pair of draw rolls 161, wherein the second midstream pair of draw rolls 179 are configured to further draw the second edge portion 105b of the glass ribbon 105 along the draw path 153. As shown, the second midstream pair of draw rolls 179 can include a first pull roll member 181a and a second pull roll member 181b. The first and second pull roll members 181a, 181b can each be provided with a respective refractory roll covering 183a, 183b configured to engage the second edge portion 105b of the glass ribbon 105 therebetween. At least one of the first and second pull roll members 181a, 181b may be provided with a respective motor 185a, 185b. For example, as shown, both the first and second pull roll members 181a, 181b are provided with a respective motor 185a, 185b. In further examples, only one of the first and second pull roll members 181a, 181b is provided with a motor wherein the other pull roll member may be provided with a bearing such that only one of the first and second pull roll members 181a, 181b is driven.

Figure 5:
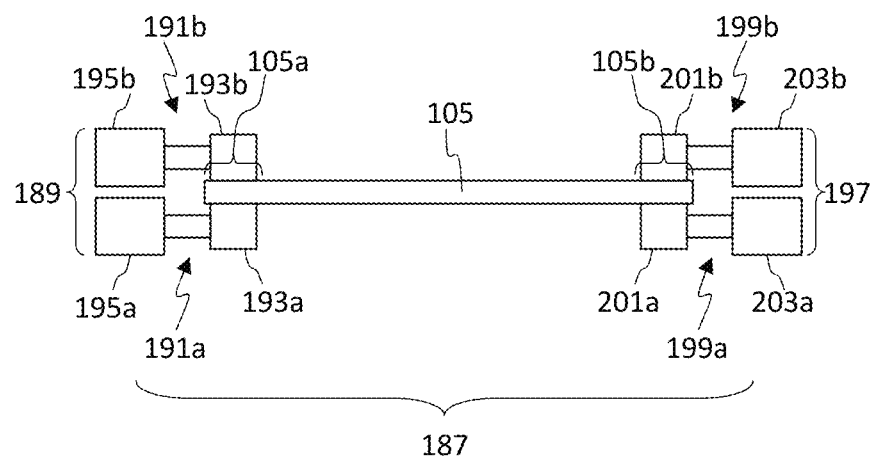
FIG. 5 is a top view of the glass manufacturing apparatus of FIG. 1 at a third elevation according to an exemplary embodiment of the disclosure.

As shown in FIG. 1, FIG. 2, and FIG. 5, the pull roll device 115 further includes a third pull roll apparatus 187 including a first downstream pair of draw rolls 189 positioned downstream along the draw path 153 from the first midstream pair of draw rolls 171, wherein the first downstream pair of draw rolls 189 are configured to further draw the first edge portion 105a of the glass ribbon 105 along the draw path 153. As shown, the first downstream pair of draw rolls 189 can include a first pull roll member 191a and a second pull roll member 191b. The first and second pull roll members 191a, 191b can each be provided with a respective refractory roll covering 193a, 193b configured to engage the first edge portion 105a of the glass ribbon 105 therebetween. At least one of the first and second pull roll members 191a, 191b may be provided with a respective motor 195a, 195b. For example, as shown, both the first and second pull roll members 191a, 191b are provided with a respective motor 195a, 195b. In further examples, only one of the first and second pull roll members 191a, 191b is provided with a motor wherein the other pull roll member may be provided with a bearing such that only one of the first and second pull roll members 191a, 191b is driven.

In another example, in addition or in alternative to the first downstream pair of draw rolls 189, the third pull roll apparatus 187 can include a second downstream pair of draw rolls 197 positioned downstream along the draw path 153 from the second midstream pair of draw rolls 179, wherein the second downstream pair of draw rolls 197 are configured to further draw the second edge portion 105b of the glass ribbon 105 along the draw path 153. As shown, the second downstream pair of draw rolls 197 can include a first pull roll member 199a and a second pull roll member 199b. The first and second pull roll members 199a, 199b can each be provided with a respective refractory roll covering 201a, 201b configured to engage the second edge portion 105b of the glass ribbon 105 therebetween. At least one of the first and second pull roll members 199a, 199b may be provided with a respective motor 203a, 203b. For example, as shown, both the first and second pull roll members 199a, 199b are provided with a respective motor 203a, 203b. In further examples, only one of the first and second pull roll members 199a, 199b is provided with a motor wherein the other pull roll member may be provided with a bearing such that only one of the first and second pull roll members 199a, 199b is driven. It should be appreciated that the pulling roll device 115 may also include optional pair(s) of edge rolls 202 (202a, 202b) and 204 and/or optional pair(s) of idle stub rolls 206, 208 (See FIGS. 1, 2, and 6).

Figure 6:
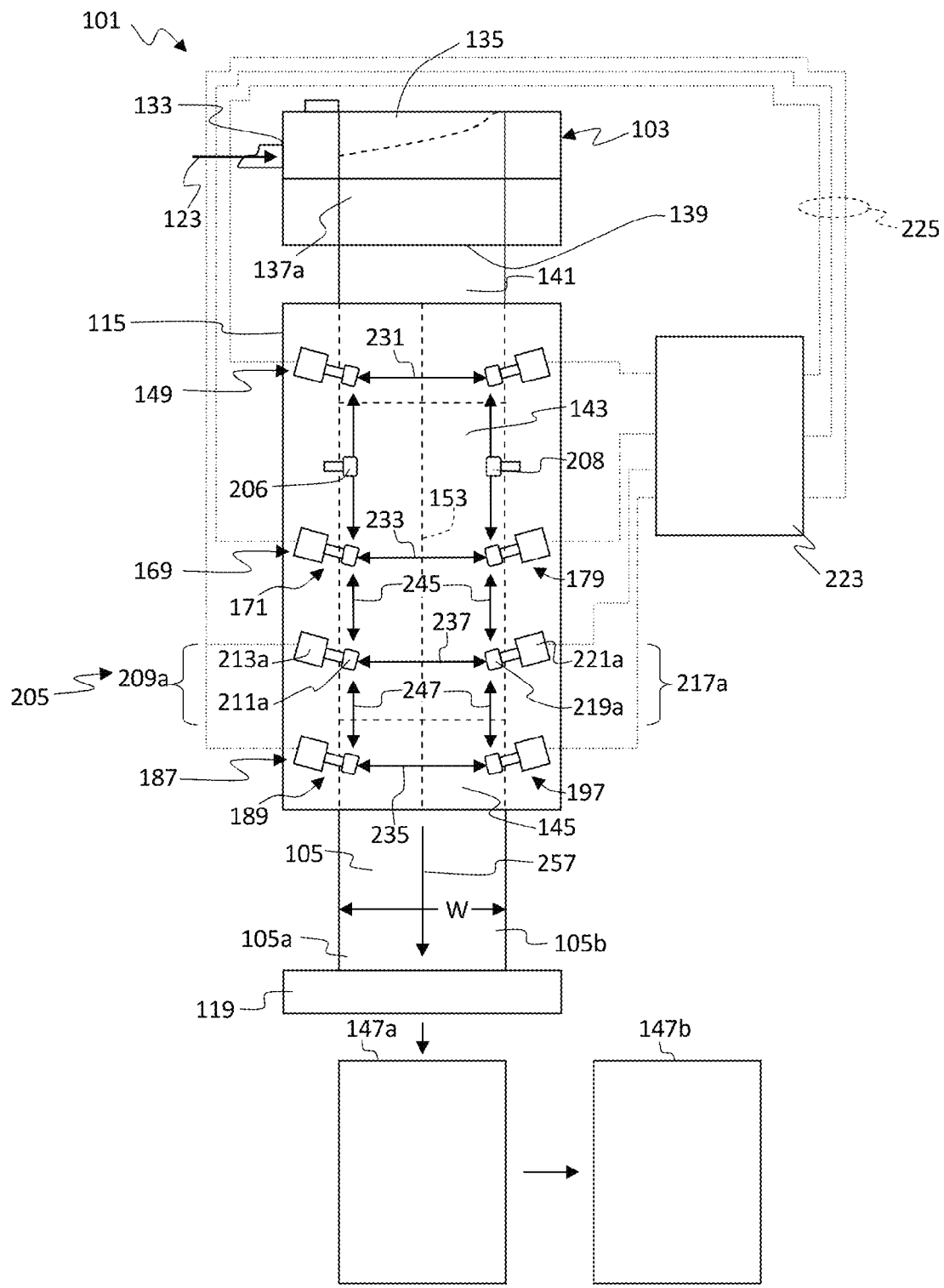
FIG. 6 illustrates a glass manufacturing apparatus according to an exemplary embodiment of the disclosure.
Figure 7:
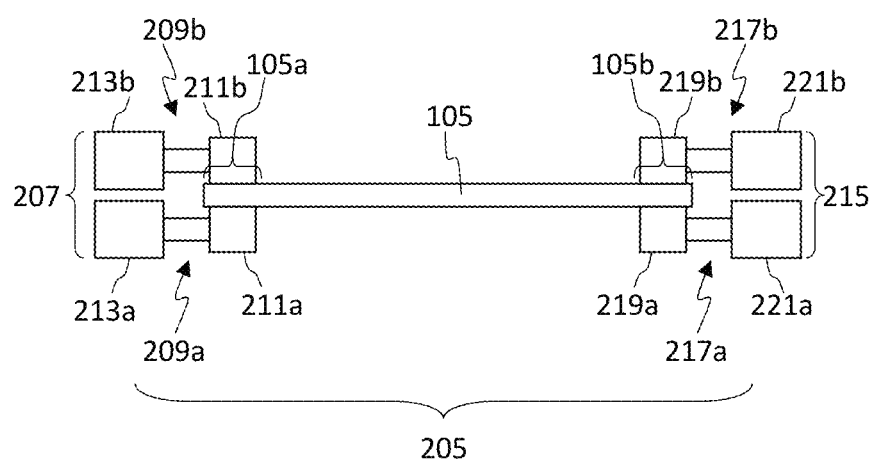
FIG. 7 is a top view of the glass manufacturing apparatus of FIG. 6 at an intermediate elevation according to an exemplary embodiment of the disclosure.

As shown in FIG. 6 and FIG. 7, the pull roll device 115 can further include an intermediate pull roll apparatus 205 including a first intermediate pair of draw rolls 207 positioned downstream along the draw path 153 from the first midstream pair of draw rolls 171 and upstream along the draw path from the first downstream pair of draw rolls 189. The first intermediate pair of draw rolls 207 are configured to further draw the first edge portion 105a of the glass ribbon 105 along the draw path 153. As shown, the first intermediate pair of draw rolls 207 can include a first pull roll member 209a and a second pull roll member 209b. The first and second pull roll members 209a, 209b can each be provided with a respective refractory roll covering 211a, 211b configured to engage the first edge portion 105a of the glass ribbon 105 therebetween. At least one of the first and second pull roll members 209a, 209b may be provided with a respective motor 213a, 213b. For example, as shown, both the first and second pull roll members 213a, 213b are provided with a respective motor 213a, 213b. In further examples, only one of the first and second pull roll members 209a, 209b is provided with a motor wherein the other pull roll member may be provided with a bearing such that only one of the first and second pull roll members 209a, 209b is driven.

In another example, in addition or in alternative to the first intermediate pair of draw rolls 207, the intermediate pull roll apparatus 205 can include a second intermediate pair of draw rolls 215 positioned downstream along the draw path 153 from the second midstream pair of draw rolls 179 and upstream along the draw path 153 from the second downstream pair of draw rolls 197. The second midstream pair of draw rolls 215 are configured to further draw the second edge portion 105b of the glass ribbon 105 along the draw path 153. As shown, the second intermediate pair of draw rolls 215 can include a first pull roll member 217a and a second pull roll member 217b. The first and second pull roll members 217a, 217b can each be provided with a respective refractory roll covering 219a, 219b configured to engage the second edge portion 105b of the glass ribbon 105 therebetween. At least one of the first and second pull roll members 217a, 217b may be provided with a respective motor 221a, 221b. For example, as shown, both the first and second pull roll members 217a, 217b are provided with a respective motor 221a, 221b. In further examples, only one of the first and second pull roll members 217a, 217b is provided with a motor wherein the other pull roll member may be provided with a bearing such that only one of the first and second pull roll members 217a, 217b is driven.

Although the intermediate pull roll apparatus 205 is described and illustrated as positioned at a fourth elevation between the second pull roll apparatus 169 and the third pull roll apparatus 187, the disclosure is not limited to these exemplary embodiments. The intermediate pull roll apparatus 205 may be positioned at various elevations of the pull roll device 115. Further, the intermediate pull roll apparatus 205 may be modular such that multiple pull roll apparatus 205 may be included in the pull roll device 115 and positioned along the draw path 153 at various elevations.

While each pair of draw rolls has been described as including a first and second pull roll member, the first and second pull roll members can also be referred to as a draw roll of the pair of draw rolls.

The pull roll device 115 of the glass manufacturing apparatus 101 can further include a control device 223 (e.g., programmable logic controller) configured to independently operate the first pull roll apparatus 149, the second pull roll apparatus 169, and the third pull roll apparatus 187 such that at least one of the first upstream pair of draw rolls 151 rotates with a substantially constant torque, at least one of the first midstream pair of draw rolls 171 rotates with a substantially constant torque, and at least one of the first downstream pair of draw rolls 189 rotates with a substantially constant angular velocity. The control device 223 can communicate 225 with the pull roll apparatus 149, 169, 187, 205 through cables, wireless networks, wired networks, combinations thereof, and the like. Independent operation of the first, second, and third pull roll apparatus 149, 169, 187, for purposes of this disclosure, means that one of the first, second, and third pull roll apparatus may be operated without being affected by operation of the other of the first, second, and third pull roll apparatus. As such, for example, independently operating the first pull roll apparatus 149 with the control device 223 provides for the control device to operate the first pull roll apparatus 149 without considering changes in operating parameters of the second pull roll apparatus 169 or the third pull roll apparatus 187. Also, for example, independently operating the second pull roll apparatus 169 with the control device 223 provides for the control device to operate the second pull roll apparatus 169 without considering changes in operating parameters of the first pull roll apparatus 149 or the third pull roll apparatus 187. Further, for example, independently operating the third pull roll apparatus 187 with the control device 223 provides for the control device to operate the third pull roll apparatus 187 without considering changes in operating parameters of the first pull roll apparatus 149 or the second pull roll apparatus 169.

As mentioned previously, the first upstream pair of draw rolls 151 can include a single motor associated with one of the first or second pull roll members 155a, 155b. In such an example, the control device 223 can operate the single motor such that the associated first or second pull roll members 155a, 155b is rotated with a substantially constant torque. As further described above, each of the first and second pull roll members 155a, 155b may be provided with a corresponding motor 159a, 159b. In such examples, the control device 223 may operate the motors 159a, 159b such that at least one, such as both, of the first upstream pair of draw rolls 151 rotate with a substantially constant torque. Rotating both pull roll members 159a, 159b of the first upstream pair of draw rolls 151 with a substantially constant torque may be desirable to apply force equally at both sides of the first edge portion 105a of the glass ribbon 105.

As mentioned previously, first pull roll apparatus 149 may also include an optional second upstream pair of draw rolls 161. In such examples, the second upstream pair of draw rolls 161 can include a single motor associated with one of the first or second pull roll members 163a, 163b. In such an example, the control device 223 can operate the single motor such that the associated first or second pull roll members 163a, 163b is rotated with a substantially constant torque. As further described above, each of the first and second pull roll members 163a, 163b may be provided with a corresponding motor 167a, 167b. In such examples, the control device 223 may operate the motors 167a, 167b such that at least one, such as both, of the second upstream pair of draw rolls 161 rotate with a substantially constant torque. Rotating both pull roll members 163a, 163b of the second upstream pair of draw rolls 161 with a substantially constant torque may be desirable to apply force equally at both sides of the second edge portion 105b of the glass ribbon 105.

Although not required, in some examples, the control device 223 can operate one or both of the motors associated with the first upstream pair of draw rolls 151 with a substantially constant first torque and can simultaneously operate one or both of the motors associated with the second upstream pair of draw rolls 161 to rotate with a substantially constant second torque that is substantially equal to the first torque. Providing substantially equal first and second torques can be desired, for example, to apply substantially the same force to the glass ribbon 105 and the first and second edge portions 105a, 105b.

As mentioned previously, second pull roll apparatus 169 may also include an optional second midstream pair of draw rolls 179. In such examples, the second midstream pair of draw rolls 179 can include a single motor associated with one of the first or second pull roll members 181a, 181b. In such an example, the control device 223 can operate the single motor such that the associated first or second pull roll members 181a, 181b is rotated with a substantially constant torque. As further described above, each of the first and second pull roll members 181a, 181b may be provided with a corresponding motor 185a, 185b. In such examples, the control device 223 may operate the motors 185a, 185b such that at least one, such as both, of the second midstream pair of draw rolls 179 rotate with a substantially constant torque. Rotating both pull roll members 181a, 181b of the second midstream pair of draw rolls 179 with a substantially constant torque may be desirable to apply force equally at both sides of the second edge portion 105b of the glass ribbon 105.

Although not required, in some examples, the control device 223 can operate one or both of the motors associated with the first midstream pair of draw rolls 171 with a substantially constant first torque and can simultaneously operate one or both of the motors associated with the second midstream pair of draw rolls 179 to rotate with a substantially constant second torque that is substantially equal to the first torque. Providing substantially equal first and second torques can be desired, for example, to apply substantially the same force to the glass ribbon 105 and the first and second edge portions 105a, 105b.

As mentioned previously, first downstream pair of draw rolls 189 can include a single motor associated with one of the first or second pull roll members 191a, 191b. In such an example, the control device 223 can operate the single motor such that the associated first or second pull roll members 191a, 191b rotates with a substantially constant angular velocity. As further described above, each of the first and second pull roll members 191a, 191b may be provided with a corresponding motor 195a, 195b. In such examples, the control device 223 may operate the motors 195a, 195b such that at least one, such as both, of the first downstream pair of draw rolls 189 rotate with a substantially constant angular velocity. Rotating both pull roll members 191a, 191b of the first downstream pair of draw rolls 189 with a substantially constant angular velocity may be desirable to draw the glass ribbon equally at both sides of the first edge portion 105a of the glass ribbon 105.

As mentioned previously, third pull roll apparatus 187 may also include an optional second downstream pair of draw rolls 197. In such examples, the second downstream pair of draw rolls 197 can include a single motor associated with one of the first or second pull roll members 199a, 199b. In such an example, the control device 223 can operate the single motor such that the associated first or second pull roll members 199a, 199b is rotated with a substantially constant angular velocity. As further described above, each of the first and second pull roll members 199a, 199b may be provided with a corresponding motor 203a, 203b. In such examples, the control device 223 may operate at least one, such as both, of the second downstream pair of draw rolls 197 to rotate with a substantially constant angular velocity. Rotating both pull roll members 199a, 199b of the second downstream pair of draw rolls 197 with a substantially constant angular velocity may be desirable to draw the glass ribbon equally at both sides of the second edge portion 105b of the glass ribbon 105.

Although not required, in some examples, the control device 223 can operate one or both of the motors associated with the first downstream pair of draw rolls 189 with a substantially constant first angular velocity and can simultaneously operate one or both of the motors associated with the second downstream pair of draw rolls 197 to rotate with a substantially constant second angular velocity that is substantially equal to the first angular velocity. Providing substantially equal first and second angular velocities can be desired, for example, to draw the glass ribbon equally at the first and second edge portions 105a, 105b.

As mentioned, the control device 223 can be configured to independently operate the first pull roll apparatus 149 such that at least one of the first and second upstream pair of draw rolls 151, 161 rotates with a substantially constant torque; however, the embodiments are not so limited. That is, the control device 223 can be configured in an exemplary embodiment to independently operate the first pull roll apparatus 149 such that at least one of the first and second upstream pair of draw rolls 151, 161 rotates not with constant torque, but with a substantially constant angular velocity. Further, the control device 223 can be configured to independently operate the second pull roll apparatus 169 such that at least one of the first and second midstream pair of draw rolls 171, 179 rotates not with constant torque, but with a substantially constant angular velocity.

The control device 223 can further be configured to independently operate the intermediate pull roll apparatus 205 such that at least one of the first and second intermediate pair of draw rolls 207, 215 rotates with a substantially constant torque. Alternatively, the control device 223 can be configured to independently operate the intermediate pull roll apparatus 205 such that at least one of the first and second intermediate pair of draw rolls 207, 215 rotates not with constant torque, but with a substantially constant angular velocity.

Table 1 provides five different independent Control schemes according to exemplary embodiments of the disclosure. For example, as shown in Table 1, Control scheme "A" includes the control device 223 configured to independently operate the first pull roll apparatus 149 such that at least one of the first and second upstream pair of draw rolls 151, 161 rotates with a substantially constant torque, to independently operate the second pull roll apparatus 169 such that at least one of the first and second midstream pair of draw rolls 171, 179 rotates with a substantially constant torque, to independently operate the third pull roll apparatus 187 such that at least one of the first and second downstream pair of draw rolls 189, 197 rotates with a substantially constant angular velocity, and the control device 223 configured to independently operate the intermediate pull roll apparatus 205, if provided, such that at least one of the first and second intermediate pair of draw rolls 207, 215, rotates with a substantially constant torque or such that at least one of the first and second intermediate pair of draw rolls 207, 215, rotates not with constant torque, but with a substantially constant angular velocity.

As another example shown in Table 1, Control scheme "E" includes the control device 223 configured to independently operate the first pull roll apparatus 149 such that at least one of the first and second upstream pair of draw rolls 151, 161 rotates with a substantially constant torque, to independently operate the second pull roll apparatus 169 such that at least one of the first and second midstream pair of draw rolls 171, 179 rotates with a substantially constant torque, to independently operate the third pull roll apparatus 187 such that at least one of the first and second downstream pair of draw rolls 189, 197 rotates with a substantially constant torque, and the control device 223 configured to independently operate the intermediate pull roll apparatus 205, if provided, such that at least one of the first and second intermediate pair of draw rolls 207, 215, rotates with a substantially constant torque.

TABLE 1

| Pull Roll Apparatus | | Control | | | | |
| --- | --- | --- | --- | --- | --- | --- |
| Elevation | Position | A | B | C | D | E |
| 1 | upstream | torque | torque | torque | velocity | torque |
| 2 | midstream | torque | torque | velocity | velocity | torque |
| intermediate (optional) | intermediate (various) | torque/ velocity | torque/ velocity | velocity | velocity | torque |
| 3 | downstream | velocity | velocity | velocity | velocity | torque |

In some examples, the pairs of draw rolls discussed throughout the application may have similar constructions and orientations as set forth in U.S. Patent Application Publication No. 2009/0107182 that published on Apr. 30, 2009 to Anderson et al., which is herein incorporated by reference in its entirety. For example, any of the pairs of draw rolls may be vertically downtilted or horizontally level rolls with respect to the glass ribbon. Moreover, as shown in FIGS. 3 and 4, any of the pairs of rolls (horizontally level or downtilted) may be positioned to have a predetermined horizontal angle θ that a respective face of the rolls would be positioned relative to a respective major surface 227, 229 of the glass ribbon 105. The horizontal angle θ can be desirable to provide an appropriate level of cross-draw tension 231 and/or accommodate a taper effect that may occur during normal roll wear.

FIGS. 1 and 6 illustrate examples where each of the first pull roll members 155a, 163a, 173a, 181a, 191a, 199a, 209a, 217a of the pairs of draw rolls can comprise vertically downtilted rolls with respect to the glass ribbon 105. The second pull roll members 155b, 163b, 173b, 181b, 191b, 199b, 209b, 217b of the pairs of draw rolls can likewise comprise vertically downtilted rolls with respect to the glass ribbon 105. The downtilt angle of any pair of the draw rolls may be different or the same as any other pair of draw rolls depending on process considerations. Downtilting of the first and/or second upstream pair of draw rolls 151, 161 can provide a desired level of cross-draw tension 231 between the two pairs of draw rolls 151, 161. Downtilting of the first and/or second midstream pair of draw rolls 171, 179 can provide a desired level of cross-draw tension 233 between the two pairs of draw rolls 171, 179. Downtilting of the first and/or second downstream pair of draw rolls 189, 197 can provide a desired level of cross-draw tension 235 between the two pairs of draw rolls 189, 197. Likewise, downtilting the first and/or second intermediate pair of draw rolls 207, 215 can provide a desired level of cross-draw tension 237 between the two pairs of draw rolls 207, 215.

In some examples, the control device 223 may be configured to activate an automatic positioner (not shown) or a manual mechanism may be used to adjust the downtilt position of the vertically downtilted rolls so as to control (or tune) the average cross-draw tension 231, 233, 235, 237 across the glass ribbon 105.

In further examples, one or more of the pairs of draw rolls 151, 161, 171, 179, 189, 197, 207, 215 may be horizontally level rolls with respect to the glass ribbon wherein the rotation axis of the draw rolls extend substantially perpendicular to the draw path 105 of the glass ribbon. Providing one or both of the pairs of rolls of the pull roll device as horizontally level rolls may be desired if cross-wise tension is not necessary across the width of the glass ribbon along the pairs of rolls.

Methods of manufacturing the glass ribbon 105 will now be described with respect to the pull roll device 115 illustrated in FIGS. 1-7.

Referring to FIGS. 1, 2, and 3, the method can include the steps of providing the first pull roll apparatus 149 including the first upstream pair of draw rolls 151. In another example, the first pull roll apparatus 149 may optionally be provided with a second upstream pair of draw rolls 161.

Referring to FIGS. 1, 2, and 4, the method further includes the step of providing the second pull roll apparatus 169 including the first midstream pair of draw rolls 171 positioned downstream along the draw path 153 from the first upstream pair of draw rolls 151. In a further example, the second pull roll apparatus 169 may optionally be provided with a second midstream pair of draw rolls 179 positioned downstream along the draw path 153 from the second upstream pair of draw rolls 161.

The method further includes the step of providing the third pull roll apparatus 187 including the first downstream pair of draw rolls 189 positioned downstream along the draw path 153 from the first midstream pair of draw rolls 171. In a further example, the third pull roll apparatus 187 may optionally be provided with a second downstream pair of draw rolls 197 positioned downstream along the draw path 153 from the second midstream pair of draw rolls 179.

Optionally, the method further includes the step of providing the intermediate pull roll apparatus 205 including the first intermediate pair of draw rolls 207 positioned downstream along the draw path 153 from the first midstream pair of draw rolls 171 and upstream along the draw path 153 from the first downstream pair of draw rolls 189. In a further example, the intermediate pull roll apparatus 205 may optionally be provided with a second intermediate pair of draw rolls 215 positioned downstream along the draw path 153 from the second midstream pair of draw rolls 179 and upstream along the draw path 153 from the second downstream pair of draw rolls 197.

The method further includes the step of forming the glass ribbon 105 with the width "W" extending between the first edge portion 105a and the second edge portion 105b. The first pull roll apparatus 149 can be independently operated, for example, with the control device 223 without input from the second pull roll apparatus 169 or input from the third pull roll apparatus 187, or, when any intermediate pull roll apparatus 205 is provided, without input from the intermediate pull roll apparatus 205. For instance, the first pull roll apparatus 149 can be independently operated such that at least one draw roll (pull roll member 155a, 155b) of the first upstream pair of draw rolls 151 rotates with a substantially constant torque to draw the first edge portion 105a of the glass ribbon 105 along the draw path 153. In one example, the first pull roll apparatus 149 can be operated such that both draw rolls (pull roll members 155a, 155b) of the first upstream pair of draw rolls 151 rotate with a substantially constant torque.

The second upstream pair of draw rolls 161, if provided, can also be independently operated such that at least one draw roll (pull roll member 163a, 163b) of the second upstream pair of draw rolls 161 rotates with a substantially constant torque to draw the second edge portion 105b of the glass ribbon 105 along the draw path 153. In one example, the first pull roll apparatus 149 can be operated such that both of the draw rolls (pull roll members 163a, 163b) of the second upstream pair of draw rolls 161 rotate with a substantially constant torque. As such, a desired tension 239 along the draw path 153 may be maintained in the glass ribbon 105 between the root 139 and the first pull roll apparatus 149.

The method further independently operates the second pull roll apparatus 169 such that at least one draw roll (pull roll member 173a, 173b) of the first midstream pair of draw rolls 171 rotates with a substantially constant torque to further draw the first edge portion 105a of the glass ribbon 105 along the draw path 153. In one example, the method can include the step of operating the second pull roll apparatus 169 such that both draw rolls (pull roll members 173a, 173b) of the first midstream pair of draw rolls 171 rotate with a substantially constant torque.

The second midstream pair of draw rolls 179, if provided, can also be independently operated such that at least one draw roll (pull roll member 181a, 181b) of the second midstream pair of draw rolls 179 rotates with a substantially constant torque to draw the second edge portion 105b of the glass ribbon 105 along the draw path 153. In one example, the second pull roll apparatus 169 can be operated such that both of the draw rolls (pull roll members 181a, 181b) of the second midstream pair of draw rolls 179 rotate with a substantially constant torque. As such, a desired tension 241 along the draw path 153 may be maintained in the glass ribbon 105 between the first pull roll apparatus 149 and the second pull roll apparatus 169.

The method further independently operates the third pull roll apparatus 187 such that at least one draw roll (pull roll member 191a, 191b) of the first downstream pair of draw rolls 189 rotates with a substantially constant angular velocity to further draw the first edge portion 105a of the glass ribbon 105 along the draw path 153. In one example, the method can include the step of operating the third pull roll apparatus 187 such that both draw rolls (pull roll members 191a, 191b) of the first downstream pair of draw rolls 189 rotate with a substantially constant angular velocity.

The second downstream pair of draw rolls 197, if provided, can also be independently operated such that at least one draw roll (pull roll member 199a, 199b) of the second downstream pair of draw rolls 197 rotates with a substantially constant angular velocity to further draw the second edge portion 105b of the glass ribbon 105 along the draw path 153. In one example, the method can include the step of operating the third pull roll apparatus 187 such that both draw rolls (pull roll members 199a, 199b) of the second downstream pair of draw rolls 197 rotate with a substantially constant angular velocity. As such, a desired tension 243 along the draw path 153 may be maintained in the glass ribbon 105 between the second pull roll apparatus 169 and the third pull roll apparatus 187.

When provided, the method further independently operates the intermediate pull roll apparatus 205 such that at least one draw roll (pull roll member 209a, 209b) of the first intermediate pair of draw rolls 207 rotates with a substantially constant torque to further draw the first edge portion 105a of the glass ribbon 105 along the draw path 153 (FIGS. 6 and 7). In one example, the method can include the step of operating the intermediate pull roll apparatus 205 such that both draw rolls (pull roll members 209a, 209b) of the first intermediate pair of draw rolls 207 rotate with a substantially constant torque.

The second intermediate pair of draw rolls 215, if provided, can also be independently operated such that at least one draw roll (pull roll member 217a, 217b) of the second intermediate pair of draw rolls 215 rotates with a substantially constant torque to further draw the second edge portion 105b of the glass ribbon 105 along the draw path 153. In one example, the method can include the step of operating the intermediate pull roll apparatus 205 such that both draw rolls (pull roll members 217a, 217b) of the second intermediate pair of draw rolls 215 rotate with a substantially constant torque. As such, a desired tension 245 along the draw path 153 may be maintained in the glass ribbon 105 between the second pull roll apparatus 169 and the intermediate pull roll apparatus 205 and a desired tension 247 along the draw path 153 may be maintained in the glass ribbon 105 between the intermediate pull roll apparatus 205 and the third pull roll apparatus 187.

While the exemplary embodiments describe the first pull roll apparatus 149 operated in constant torque mode, the second pull roll apparatus 169 operated in constant torque mode, the third pull roll apparatus 187 operated in constant angular velocity mode, and the intermediate pull roll apparatus 205 operated in constant torque mode, the disclosure is not so limited. That is, each one of the pull roll apparatus can be operated in a constant torque mode or a constant angular velocity mode. For example, the pull roll apparatus can be operated in the Control schemes of Table 1. For example, the first pull roll apparatus 149 can be operated in constant torque mode, the second pull roll apparatus 169 can be operated in constant angular velocity mode, the third pull roll apparatus 187 operated in constant angular velocity mode, and the intermediate pull roll apparatus 205, if provided, operated in constant angular velocity mode in Control scheme "C" of Table 1.

The method can further include the step of sequentially separating a plurality of glass sheets 147a, 147b from the glass ribbon 105 over a period of time at a location downstream along the draw path 153 from the first downstream pair of draw rolls 189. For example, as shown in FIGS. 1 and 2, the separating device 119 may be periodically activated to sequentially separate a plurality of glass sheets 147a, 147b as the glass ribbon 105 is drawn from the forming device 103.

Figure 8:
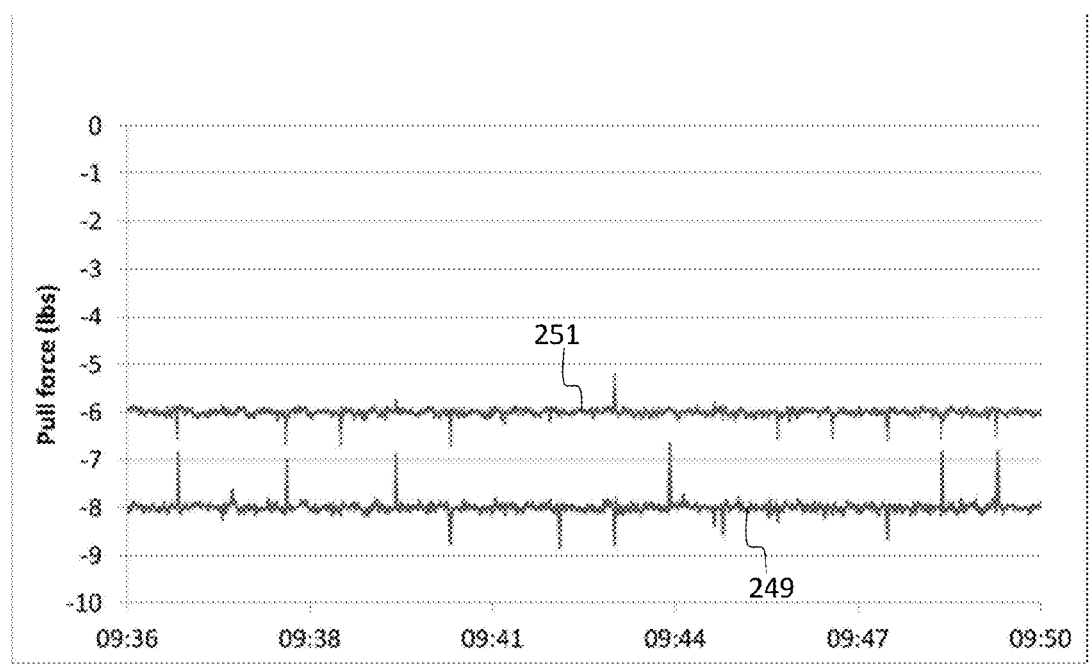
FIG. 8 illustrates an exemplary graph of independent constant force input control at two different elevations according to exemplary embodiments of the disclosure.

FIG. 8 shows constant force at two different elevations, for example, curve 249 shows the constant force at the first pull roll apparatus 149 in the viscous zone 141 in FIG. 1 and curve 251 shows the constant force at the second pull roll apparatus 169 in the setting (visco-elastic) zone 143 in FIG. 1. The control device 223 can be configured by a user to independently operate the first pull roll apparatus 149 and the second pull roll apparatus 169 at constant force over time. Hence, the glass ribbon 105 experiences constant vertical forces from the root 139 to the lowest roll, the third pull roll apparatus 187.

As shown in FIG. 1, the lowest roll, the third pull roll apparatus 187, operates as the master roll and operates at constant velocity to control the speed of the glass ribbon 105.

Figure 9:
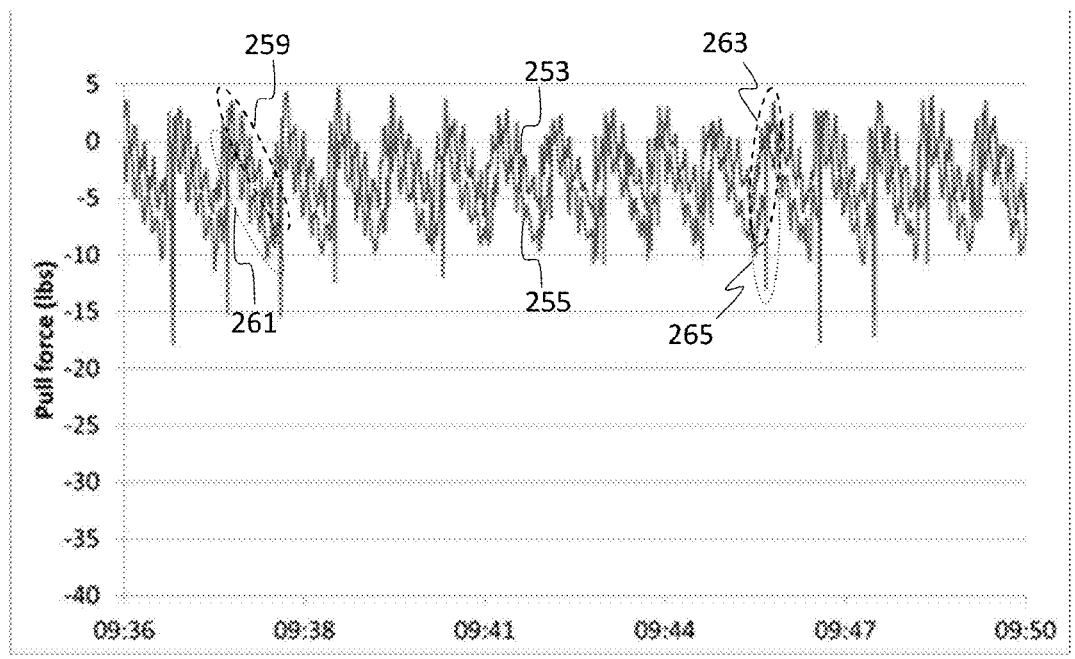
FIG. 9 illustrates an exemplary graph of the forces experienced at the lowest draw rolls according to exemplary embodiments of the disclosure.

FIG. 9 shows an example graph of the forces applied to the glass ribbon 105 by the first and second downstream pair of draw rolls 189, 197. The Y-axis is force (pounds) and the X-axis is time (hours: minutes). One plot 253 represents the force being applied to the glass ribbon 105 by the first downstream pair of draw rolls 189 at the first edge portion 105a while the other plot 255 represents the force being applied to the glass ribbon 105 by the second downstream pair of draw rolls 197 at the second edge portion 105b. The force diagram shows a saw tooth pattern associated with the gradual change in glass ribbon 105 weight due to growth and the abrupt change in glass ribbon 105 weight due to snap-off of a glass sheet 147a from the glass ribbon 105. Since the third pull roll apparatus 187 is located downstream of the visco-elastic zone 143 as described by the viscosity equation (Equation 1), in the elastic zone 145 as shown in FIG. 1, the first and second downstream pair of draw rolls 189, 197 isolate propagation of perturbations into the visco-elastic (setting) zone 143.

$$\frac{\eta(T)}{G} = 10000 \text{ sec} \qquad \text{[Equation 1]}$$

Where Viscosity ($\eta$) has units of Pa·s and Shear Modulus (G) has units of Pa. Therefore $\eta$/G has units of time.

As shown in FIGS. 8 and 9, throughout a period of time, the first and second upstream pair of draw rolls 151, 161 and the first and second midstream pair of draw rolls 171, 179 apply a substantially constant force to the first and second edge portions 105a, 105b of the glass ribbon 105 along the draw path 153 and the first and second downstream pair of draw rolls 189, 197 apply a varying force to the first and second edge portions 105a, 105b of the glass ribbon 105 along the draw path 153.

Figure 10:
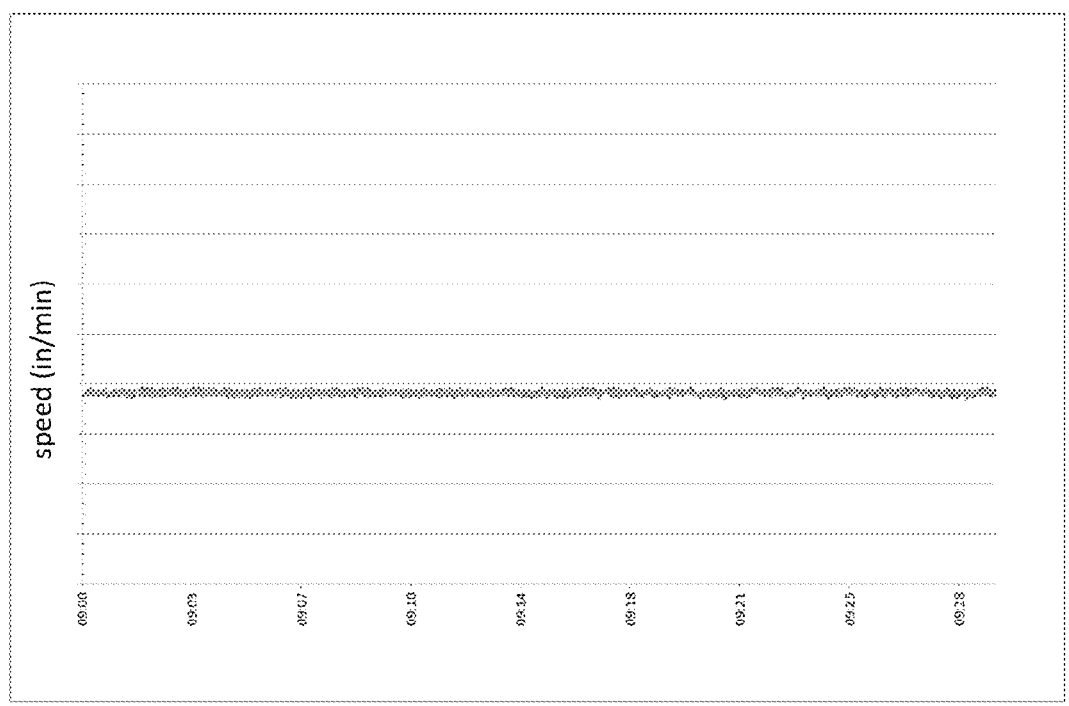
FIG. 10 illustrates an exemplary graph of the speed of the lowest draw rolls according to exemplary embodiments of the disclosure.

FIG. 10 shows the first and second downstream pairs of draw rolls 189, 197 of the third pull roll apparatus 187, which is the lowest (or master) pull roll apparatus, speed as a function of time (hours: minutes) and shows that the constant speed (each tick mark is 0.2 in/min (50.8 mm/min)) controls glass ribbon 105 thickness and maintains superior attributes. This speed is readily adjusted via the control device 223 to obtain the desired product specifications, such as thickness.

As shown in FIG. 1, the glass ribbon 105 is drawn in a draw direction 257 along the draw path 153. Turning back to FIGS. 8, 9, and 10, throughout the period of time, first and second upstream pair of draw rolls 151, 161 each applies a substantially constant force (e.g., 8 pounds) to the respective first and second edge portions 105a, 105b of the glass ribbon 105 in a direction opposite the draw direction 257. Throughout the period of time, first and second midstream pair of draw rolls 171, 179 also each applies a substantially constant force (e.g., 6 pounds) to the respective first and second edge portions 105a, 105b of the glass ribbon 105 in a direction opposite the draw direction 257. As further illustrated, the first and second downstream pair of draw rolls 189, 197 each applies a varying force to the respective first and second edge portions 105a, 105b of the glass ribbon 105 from in a direction of the draw direction 257 (e.g., from about 5 pounds) to in a direction opposite the draw direction 257 (e.g., to about 18 pounds). As such, the first edge portion 105a is constantly maintained in tension between the first upstream pair of draw rolls 151, the first midstream pair of draw rolls 171, and the first downstream pair of draw rolls 189 throughout the period of time. Likewise, the second edge portion 105b is constantly maintained in tension between the second upstream pair of draw rolls 161, the second midstream pair of draw rolls 179, and the second downstream pair of draw rolls 197 throughout the period of time. In further examples, all forces on both edges 105a, 105b may act in the positive or negative direction with respect to the draw direction 257 depending on the apparatus set up.

As further shown in FIG. 9, the first and second downstream pairs of draw rolls 189, 197 each applies a varying force due to the constant angular velocity associated with the draw rolls 189, 197. The patterns 259, 261 of the plots 253, 255 represents the changing force as the glass ribbon 105 increases in length while the patterns 263, 265 represent the sudden change in force that occurs during separation of a glass sheet 147a from the glass ribbon 105. During the same period of time, the constant torque of the first and second upstream pair of draw rolls 151, 161 can maintain a substantially constant force to the glass ribbon 105, and the constant torque of the first and second midstream pair of draw rolls 171, 179 can also maintain a substantially constant force to the glass ribbon 105. As such, force disturbances can be prevented from being transmitted up the glass ribbon into the setting zone 143 where stress concentrations and corresponding surface defects may be undesirably frozen into the glass ribbon 105.

As such, methods of the present disclosure can independently operate the first pull roll apparatus 149 over a period of time such that the first upstream pair of draw rolls 151 apply a substantially constant force to the first edge portion 105a of the glass ribbon 105 along the draw path 153. The method can further include the step of independently operating the second pull roll apparatus 169 over the period of time such that at least one of the first downstream pair of draw rolls 171 apply a substantially constant force to the first edge portion 105a of the glass ribbon 105 along the draw path 153. The method can further include the step of independently operating the third pull roll apparatus 187 over the period of time such that at least one of the first downstream pair of draw rolls 189 rotates with a substantially constant angular velocity and the first downstream pair of draw rolls 189 apply a varying force to the first edge portion 105a of the glass ribbon 105 along the draw path 153. The method can further include the step of sequentially separating a plurality of glass sheets 147a from the glass ribbon 105 over the period of time at a location downstream along the draw path 153 from the first downstream pair of draw rolls 189.

As discussed above, the first pull roll apparatus 149 can be provided with a second upstream pair of draw rolls 161. In such examples, the method can further include the step of operating the first pull roll apparatus 149 such that the second upstream pair of draw rolls 161 apply a substantially constant force to the second edge portion 105b of the glass ribbon 105 along the draw path 153. As mention previously, the second pull roll apparatus 169 can include a second midstream pair of draw rolls 179 positioned downstream along the draw path 153 from the second upstream pair of draw rolls 161. The method can further include the step of operating the second pull roll apparatus 169 such that the second midstream pair of draw rolls 179 apply a substantially constant force to the second edge portion 105b of the glass ribbon 105 along the draw path 153. Still further, as mention previously, the third pull roll apparatus 187 can include a second downstream pair of draw rolls 197 positioned downstream along the draw path 153 from the second midstream pair of draw rolls 179. In such examples, the method can further include the step of operating the third pull roll apparatus 187 such that at least one of the second downstream pair of draw rolls 197 rotates with a substantially constant angular velocity and the second downstream pair of draw rolls 197 apply a varying force to the second edge portion 105b of the glass ribbon 105 along the draw path 153.

The method can further include the step of independently operating the intermediate pull roll apparatus 205, when provided, over the period of time such that at least one of the first intermediate pair of draw rolls 207 apply a substantially constant force to the first edge portion 105a of the glass ribbon 105 along the draw path 153. As discussed above, the intermediate pull roll apparatus 205 can be provided with a second intermediate pair of draw rolls 215. In such examples, the method can further include the step of operating the intermediate pull roll apparatus 205 such that the second intermediate pair of draw rolls 215 apply a substantially constant force to the second edge portion 105b of the glass ribbon 105 along the draw path 153.

The pull roll device 115 can be used to improve the consistency of a cross-draw tension and/or down-draw sheet tension in the glass ribbon which reduces residual stress and improves glass flatness on the manufactured glass ribbon. More specifically, the pull roll device 115 can be used to control and improve the consistency of the cross-draw tension and/or down-draw sheet tension in the area where the glass ribbon is passing through the setting zone where the product stress and flatness are set in the glass ribbon.

In a comparative exemplary embodiment, a pull roll device may only have an upper pull roll apparatus and a lower pull roll apparatus. In such a comparative pull roll device, a pinch force to achieve the necessary constant torque or constant velocity at the upper pull roll apparatus and the lower pull roll apparatus, respectively, would have to be too great for large weight glass ribbon, such that the pinch force between a pair of draw rolls would crack the glass ribbon. Large weight glass ribbon may be present when manufacturing large glass sheets of large width and large length and a small thickness.

Moreover, operating the upstream pairs of draw rolls, the midstream pairs of draw rolls, and when provided, the intermediate pairs of draw rolls, in substantially constant torque mode as set forth by exemplary embodiments of the present application and as shown by plots 249, 251 provides further advantages over operating the upstream pairs of draw rolls and the midstream pairs of draw rolls with a substantially constant angular velocity. First, a constant angular velocity of the upstream and midstream pairs of draw rolls, and when provided, the intermediate pairs of draw rolls, may provide different tensions at different diameters in the rolls. In contrast, operating the upstream and midstream pairs of draw rolls, and when provided, the intermediate pairs of draw rolls, at substantially constant torques allows consistent vertical tension to be achieved over time. Indeed, operating with substantially constant torques nearly compensates for wear of the rolls. Forces change slightly with roll diameter as the roll wears at constant torque, but the effect is very small. Velocity control has a much higher sensitivity to roll diameter. Second, a constant angular velocity of the upstream and midstream pairs of draw rolls, and when provided, the intermediate pairs of draw rolls, may prove difficult to correlate with the sheet speed due to the diameter uncertainty of the roll. In contrast, operating the upstream and midstream pairs of draw rolls, and when provided, the intermediate pairs of draw rolls, with substantially constant torque removes the need to correlate to obtain the proper angular velocity of the roller. Third, operating the upstream and midstream pairs of draw rolls, and when provided, the intermediate pairs of draw rolls, with substantially constant torque can avoid the risk of buckling or crack out that may occur when trying to adjust the speed of the upstream or midstream pairs of draw rolls, or when provided, the intermediate pairs of draw rolls, to compensate for roll wear. Fourth, operating the upstream and midstream pairs of draw rolls, and when provided, the intermediate pairs of draw rolls, with a substantially constant torque can avoid the risk of the rolls skipping if the constant angular velocity is too slow. Fifth, operating the upstream and midstream pairs of draw rolls, and when provided, the intermediate pairs of draw rolls, can avoid excess pull force variability that may occur due to roll run-out in constant angular velocity mode.

Thus, exemplary embodiments of the disclosure enable increased traction on the glass ribbon due to the use of multiple elevations of driven rolls. Accordingly, larger, heavier sheets, and thinner sheets with flatter surfaces may be manufactured.

Exemplary embodiments of the disclosure enable application of modular design that readily extends into four or more elevations.

Exemplary embodiments of the disclosure enable the placement of driven rolls at the desired elevations to provide the vertical and cross draw forces required to maintain flat glass ribbon through the visco-elastic zone. Accordingly, longer and wider visco-elastic zones can be achieved.

Exemplary embodiments of the disclosure enable placement of the lowest roll below the visco-elastic zone to maintain constant vertical force from the root through the visco-elastic zone as well as to isolate the visco-elastic zone from perturbations downstream, for example, perturbations such as impact of ribbon growth and snap-off of the ribbon into sheet.

Some of the functional units, such as the control device, described in this specification have been labeled as modules, in order to emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like. A module may also be implemented with valves, pistons, gears, connecting members, and springs, or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

A module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. Operational data may be collected as a single data set, or may be distributed over different locations including over different storage devices.

Reference throughout this specification to embodiments, examples, exemplary embodiments, and similar language throughout this specification may, but do not necessarily, refer to the same embodiment. Furthermore, the described features, structures, or characteristics of the subject matter described herein with reference to an exemplary embodiment may be combined in any suitable manner in one or more exemplary embodiments. In the description, numerous specific details are provided, such as examples of controls, structures, algorithms, programming, software modules, user selections, hardware modules, hardware circuits, hardware chips, processes, compositions, articles, etc., to provide a thorough understanding of embodiments of the subject matter. One skilled in the relevant art will recognize, however, that the subject matter may be practiced without one or more of the specific details, or with other methods, components, materials, and so forth. In other instances, well-known structures, materials, or operations are not shown or described in detail to avoid obscuring aspects of the disclosed subject matter.

The methods described above are generally set forth in logical flow. As such, the depicted order and labeled steps are indicative of representative embodiments. Other steps and methods may be conceived that are equivalent in function, logic, or effect to one or more steps, or portions thereof, of the methods illustrated in the exemplary embodiments. Additionally, the format and descriptions employed are provided to explain the logical steps and are understood not to limit the scope of the methods illustrated. Additionally, the order in which a particular method occurs may or may not strictly adhere to the order of the corresponding steps described.

It will be apparent to those skilled in the art that various modifications and variations can be made in the present disclosure without departing from the spirit or scope of the claimed invention. Thus, it is intended that the present claimed invention cover the modifications and variations of this disclosure provided they come within the scope of the appended claims and their equivalents.

What is claimed is:

1. A method of manufacturing a glass ribbon, comprising:
providing a first pull roll apparatus comprising a first upstream pair of draw rolls, a second pull roll apparatus comprising a first midstream pair of draw rolls positioned downstream along a draw path from the first upstream pair of draw rolls, and a third pull roll apparatus comprising a first downstream pair of draw rolls positioned downstream along the draw path from the first midstream pair of draw rolls;
forming a glass ribbon with a width extending between a first edge portion and a second edge portion;
independently operating the first pull roll apparatus such that at least one draw roll of the first upstream pair of draw rolls rotates with a substantially constant torque to draw the first edge portion of the glass ribbon along the draw path, wherein the first upstream pair of draw rolls apply a substantially constant force to the first edge portion of the glass ribbon along the draw path;
independently operating the second pull roll apparatus such that at least one draw roll of the first midstream pair of draw rolls rotates with a substantially constant torque to further draw the first edge portion of the glass ribbon along the draw path, wherein the first midstream pair of draw rolls apply a substantially constant force to the first edge portion of the glass ribbon along the draw path that is different from the substantially constant force applied by the first upstream pair of draw rolls to the first edge portion of the glass ribbon; and
independently operating the third pull roll apparatus such that at least one of the first downstream pair of draw rolls rotates with a substantially constant angular velocity to further draw the first edge portion of the glass ribbon along the draw path.

2. The method of claim 1, further comprising:
independently operating the first pull roll apparatus such that both of the draw rolls of the first upstream pair of draw rolls rotates with a substantially constant torque;
independently operating the second pull roll apparatus such that both of the draw rolls of the first midstream pair of draw rolls rotates with a substantially constant torque; and
independently operating the third pull roll apparatus such that both of the draw rolls of the first downstream pair of draw rolls rotates with a substantially constant angular velocity.

3. The method of claim 2, further comprising:
providing the first pull roll apparatus with a second upstream pair of draw rolls, the second pull roll apparatus with a second midstream pair of draw rolls positioned downstream along the draw path from the second upstream pair of draw rolls, and the third pull roll apparatus with a second downstream pair of draw rolls positioned downstream along the draw path from the second midstream pair of draw rolls;
independently operating the first pull roll apparatus such that at least one of the draw rolls of the second upstream pair of draw rolls rotates with a substantially constant torque to draw the second edge portion of the glass ribbon along the draw path;
independently operating the second pull roll apparatus such that at least one of the draw rolls of the second midstream pair of draw rolls rotates with a substantially constant torque to further draw the second edge portion of the glass ribbon along the draw path; and
independently operating the third pull roll apparatus such that at least one of the draw rolls of the second downstream pair of draw rolls rotates with a substantially constant angular velocity to further draw the second edge portion of the glass ribbon along the draw path.

4. The method of claim 3, further comprising:
independently operating the first pull roll apparatus such that both of the draw rolls of the second upstream pair of draw rolls rotate with a substantially constant torque to draw the second edge portion of the glass ribbon along the draw path;
independently operating the second pull roll apparatus such that both of the draw rolls of the second midstream pair of draw rolls rotate with a substantially constant torque to further draw the second edge portion of the glass ribbon along the draw path; and
independently operating the third pull roll apparatus such that both of the draw rolls of the second downstream pair of draw rolls rotates with a substantially constant angular velocity to further draw the second edge portion of the glass ribbon along the draw path.

5. The method of claim 3, wherein the glass ribbon comprises a viscoelastic zone along the draw path and an elastic zone downstream along the draw path from the viscoelastic zone, and wherein, the first upstream pair of draw rolls draws the first edge portion along the draw path in the viscoelastic zone, the second upstream pair of draw rolls draws the second edge portion along the draw path in the viscoelastic zone, the first midstream pair of draw rolls draws the first edge portion along the draw path in the viscoelastic zone, the second midstream pair of draw rolls draws the second edge portion along the draw path in the viscoelastic zone, the first downstream pair of draw rolls draws the first edge portion along the draw path downstream of the viscoelastic zone of the glass ribbon, and the second downstream pair of draw rolls draws the second edge portion of the glass ribbon along the draw path downstream of the viscoelastic zone.

6. The method of claim 3, further comprising sequentially separating a plurality of glass sheets from the glass ribbon over a period of time at a location downstream along the draw path from the first downstream pair of draw rolls and the second downstream pair of draw rolls, wherein, throughout the period of time, the second upstream pair of draw rolls apply a substantially constant force to the second edge portion of the glass ribbon along the draw path, the second midstream pair of draw rolls apply a substantially constant force to the second edge portion of the glass ribbon along the draw path, the first downstream pair of draw rolls apply a varying force to the first edge portion of the glass ribbon along the draw path, and the second downstream pair of draw rolls apply a varying force to the second edge portion of the glass ribbon along the draw path.

7. The method of claim 6, wherein the glass ribbon is drawn in a draw direction along the draw path, and wherein, throughout the period of time, the first upstream pair of draw rolls apply the substantially constant force to the first edge portion of the glass ribbon in a direction opposite the draw direction, the second upstream pair of draw rolls apply a substantially constant force to the second edge portion of the glass ribbon in the direction opposite the draw direction, the first midstream pair of draw rolls apply the substantially constant force to the first edge portion of the glass ribbon in the direction opposite the draw direction, the second midstream pair of draw rolls apply a substantially constant force to the second edge portion of the glass ribbon in the direction opposite the draw direction, the first downstream pair of draw rolls apply a varying force to the first edge portion of the glass ribbon in the direction of the draw direction, and the second downstream pair of draw rolls apply a varying force to the second edge portion of the glass ribbon in the direction of the draw direction, wherein, throughout the period of time, the first edge portion is constantly maintained in tension between the first upstream pair of draw rolls and the first midstream pair of draw rolls and between the first midstream pair of draw rolls and the first downstream pair of draw rolls, and the second edge portion is constantly maintained in tension between the second upstream pair of draw rolls and the second midstream pair of draw rolls and between the second midstream pair of draw rolls and the second downstream pair of draw rolls.

8. The method of claim 7, wherein, throughout the period of time, the glass ribbon is constantly maintained in tension in a lateral direction transverse to the draw direction between the first upstream pair of draw rolls and the second upstream pair of draw rolls, between the first midstream pair of draw rolls and the second midstream pair of draw rolls, and between the first downstream pair of draw rolls and the second downstream pair of draw rolls.

9. The method of claim 1, further comprising:
providing an intermediate pull roll apparatus comprising an intermediate module pair of draw rolls positioned downstream along the draw path from the first midstream pair of draw rolls and upstream along the draw path from the first downstream pair of draw rolls;
independently operating the intermediate pull roll apparatus such that at least one draw roll of the intermediate pair of draw rolls rotates with a substantially constant torque to further draw the first edge portion of the glass ribbon along the draw path.

10. The method of claim 1, further comprising sequentially separating a plurality of glass sheets from the glass ribbon over a period of time at a location downstream along the draw path from the first downstream pair of draw rolls, wherein, throughout the period of time, the first upstream pair of draw rolls apply the substantially constant force to the first edge portion of the glass ribbon along the draw path, the first midstream pair of draw rolls apply the substantially constant force to the first edge portion of the glass ribbon along the draw path and the first downstream pair of draw rolls apply a varying force to the first edge portion of the glass ribbon along the draw path.

11. The method of claim 10, wherein the glass ribbon is drawn in a draw direction along the draw path, and wherein, throughout the period of time, the first upstream pair of draw rolls apply the substantially constant force to the first edge portion of the glass ribbon in a direction opposite the draw direction, the first midstream pair of draw rolls apply the substantially constant force to the first edge portion of the glass ribbon in a direction opposite the draw direction, and the first downstream pair of draw rolls apply a varying force to the first edge portion of the glass ribbon in a direction of the draw direction, wherein the first edge portion is constantly maintained in tension between the first upstream pair of draw rolls and the first midstream pair of draw rolls throughout the period of time, and wherein the first edge portion is constantly maintained in tension between the first midstream pair of draw rolls and the first downstream pair of draw rolls throughout the period of time.

12. The method of claim 10, wherein the glass ribbon is drawn in a draw direction along the draw path, and wherein, throughout the period of time, the first upstream pair of draw rolls apply substantially constant force to the first edge portion of the glass ribbon in a direction of the draw direction, the first midstream pair of draw rolls apply substantially constant force to the first edge portion of the glass ribbon in a direction of the draw direction, and the first downstream pair of draw rolls apply a varying force to the first edge portion of the glass ribbon in a direction of the draw direction, wherein the first edge portion is constantly maintained in tension between the first upstream pair of draw rolls and the first midstream pair of draw rolls throughout the period of time, and wherein the first edge portion is constantly maintained in tension between the first midstream pair of draw rolls and the first downstream pair of draw rolls throughout the period of time.

13. The method of claim 10, wherein the glass ribbon is drawn in a draw direction along the draw path, and wherein, throughout the period of time, the first upstream pair of draw rolls apply substantially constant force to the first edge portion of the glass ribbon in a direction opposite the draw direction, the first midstream pair of draw rolls apply substantially constant force to the first edge portion of the glass ribbon in a direction opposite the draw direction, and the first downstream pair of draw rolls apply a varying force to the first edge portion of the glass ribbon in a direction opposite the draw direction, wherein the first edge portion is constantly maintained in tension between the first upstream pair of draw rolls and the first midstream pair of draw rolls throughout the period of time, and wherein the first edge portion is constantly maintained in tension between the first midstream pair of draw rolls and the first downstream pair of draw rolls throughout the period of time.

14. The method of claim 1, wherein the first upstream pair of draw rolls draws the first edge portion of the glass ribbon along the draw path in the viscoelastic zone, the first midstream pair of draw rolls draws the first edge portion of the glass ribbon along the draw path in the viscoelastic zone, and the first downstream pair of draw rolls draws the first edge portion of the glass ribbon along the draw path downstream of the viscoelastic zone.

15. The method of claim 1 further comprising directing the glass ribbon between a pair of edge rolls, the pair of edge rolls positioned downstream of the first pull roll apparatus and upstream of the second pull roll apparatus.

* * * * *